April 18, 1961 W. B. KLEMPERER 2,979,832
VISUAL SIMULATOR FOR FLIGHT TRAINING DEVICE
Filed Sept. 19, 1956 6 Sheets-Sheet 4

INVENTOR:
Wolfgang B. Klemperer

By Edwin Coates
Attorney

April 18, 1961  W. B. KLEMPERER  2,979,832
VISUAL SIMULATOR FOR FLIGHT TRAINING DEVICE
Filed Sept. 19, 1956  6 Sheets-Sheet 5

INVENTOR:
Wolfgang B. Klemperer

By Edwin Coates
Attorney

April 18, 1961  W. B. KLEMPERER  2,979,832
VISUAL SIMULATOR FOR FLIGHT TRAINING DEVICE
Filed Sept. 19, 1956  6 Sheets-Sheet 6

INVENTOR:
Wolfgang B. Klemperer

By Edwin Coates
Attorney ns patent; 2,979,832
Patented Apr. 18, 1961

2,979,832
VISUAL SIMULATOR FOR FLIGHT TRAINING DEVICE

Wolfgang B. Klemperer, Los Angeles, Calif., assignor to Douglas Aircraft Company, Inc., Santa Monica, Calif.

Filed Sept. 19, 1956, Ser. No. 610,834

7 Claims. (Cl. 35—12)

This invention relates to simulators, synthetic training devices and particularly to simulated flight training devices for aircraft pilots. The invention particularly relates to the training in those phases of flight operations which concern the beginning and termination of flight such as the take-off, the landing and the approach to a landing field. The invention is directly applicable to the training of otherwise experienced pilots in the particular landing and take-off techniques of new airplane types before and after they are introduced in service.

Modern commercial airplanes as well as military aircraft have grown to such size, carrying capacity and complexity that each unit constitutes a large investment and its operation imposes a tremendous responsibility on the operator. As their speeds are continuously increased, the time available to the pilot for making vital decisions becomes correspondingly decreased. As their operational cost go up, training flights also become increasingly expensive. It has, therefore, been found necessary to supplement actual flight training by simulated flight training in stationary devices.

As the pilot operates the simulated controls on the ground, he learns through the simulated experience how to react under the equivalent real flight conditions. His reactions can be studied, recorded and discussed with him so that any mistakes can be rectified in the future. By conveying such training to the pilot on the ground instead of in the air, the chances of damage to plane and cargo and of injuries to passengers and flight personnel are minimized.

Flight training devices have been built in which the pilot, alone or together with co-pilot and other crew members, is seated in a cockpit which is fully equipped with control organs and instruments. These control organs and instruments provide a faithful replica of the real airplane to be simulated in order to give as much realism to the situation as possible. The control organs (such as steering column, aileron control wheel, rudder pedals, throttles, switches, buttons, levers and knobs) are connected to transducers and circuits to serve as inputs for a computer or a system of computers. The computer is so designed on the basis of the known or assumed reaction parameters of the simulated airplane, its control surfaces, its engines and its auxiliary machinery, as to compute currently what the resultant response, acceleration altitude, attitude, oscillation, velocity, heading and geographic position would be with due regard to other deliberate inputs such as assumed wind, gusts or malfunctions. The system also provides a realistic feel on the control organs by producing appropriate back pressures according to their excursions and to the instantaneous flight conditions of speed, altitude, etc. Known training devices of this elaborate kind were mostly designed for training pilots in extended blind flying relying on instruments only, without sight of the ground. The windows of the simulated cockpit were consequently opaque.

Now new problems arise as how to simulate the breaking out of the overcast at the end of the blind flight phase, how to quickly reconcile visual observation with the indications on the instruments, how to make last minute visual correction of a landing approach in alignment with the runway and allowance for sidewinds if any, and how to effect the flare-out and final touchdown. Such are the problems which the present invention is meant to solve by presenting to the pilot a visual picture of the landscape through a transparent windshield. The visual picture of the landscape is presented in such a manner that its appearance, its perspective and its gradual changes realistically duplicate the view of the landscape which the pilot would observe in a real flight operation under similar conditions and in a similar landing maneuver, or on a take-off.

It has been suggested to present to the trainee pilot's eye a motion picture previously taken from an airplane making a correct approach and landing on an airport. It has been further suggested to distort the projected image from the motion picture by means of controllable anamorphic optics in continuous function of the differences of the control commands as they are being given by the trainee from those given by the pilot who made the original landing. This method has certain limitations in the amount of the displacement of the flight path and the terminal point of the landing in time and space. It further introduces unnatural optical distortions into any vertical dimensions in the landscape (hills, buildings, etc.). These optical distortions often cause buildings to have noticeable tilts which are disturbing to the trainee and which limit his concentration and effective response.

The present invention provides a system for overcoming the above limitations. The invention is especially adapted to simulate conditions of take-off and landing, since problems confronting the pilot at these times for decision are generally more critical than at any other time in a complete flight. The invention is also especially adapted to be used for the introduction of the new jet airliners to the commercial airlines since the problems presented to the pilot will be more complex and the time for reaction to such problems must be considerably lower than in airplanes now in commercial use for air transport.

The invention provides a scaled-down model of a typical landscape area such as an airport with runways and buildings and the area on the approaches to the airport. A television camera is directed at the model landscape to provide, through a projector, a visual reproduction of the airport on a screen corresponding to the panorama which would be seen from the plane. The camera is carried on a mount capable of being moved in six degrees of freedom. Three of these degrees represent linear movements and the other three degrees represent angular movements. The three degrees of linear movement of the camera correspond to longitudinal movement toward or away from the airport, lateral movement with respect to the runways and vertical movement in the form of changes in altitude above the airport. The three degrees of angular movement of the camera correspond to angular attitude movements of the plane in pitch, roll and yaw.

In order to enable the camera view axis to be brought physically as close to the model landscape surface as is required to simulate the height of the pilot's eye above the ground with the airplane landed, the optical axis of the camera is broken by a mirror mounted in front of the camera lens. This mirror arrangement lends itself favorably to the mechanization of two of the six degrees of freedom of motion.

The picture taken by the camera is transmitted through a closed wire circuit to a projector and projected on a screen which is viewed by the pilot. The screen provides a two-dimensional picture but is strong and smoothly variable perspective conveys a three-dimensional illusion. During the landing maneuver, the pilot operates his controls in accordance with his impressions of what he sees on the picture presented on the screen. These controls now regulate a flight simulator computer so that it will compute and integrate the various components of linear accelerations, velocities and positions as well as angular accelerations, velocities and attitudes which the simulated airplane would successively undergo, attain or hold. The details of the construction of the flight simulator computer per se do not form a part of the present invention and such details are available from the prior art, for example, see U.S. Patent 2,591,752 to Wicklund.

As a part of the present invention, the velocities, positions and angles determined by the flight simulator computer are fed into a six-component servo system so designed that it moves the optical center of the television camera and its effective optical axis continuously into the scaled-down positions and directions over the model landscape which the real airplane would gradually assume during a similar controlled real approach over a similar real landscape. In this way, a closed-loop system is provided in which the flight pattern presented by the camera to the pilot is adjusted in accordance with the reactions of the pilot and his operation of the controls.

Figure 1:
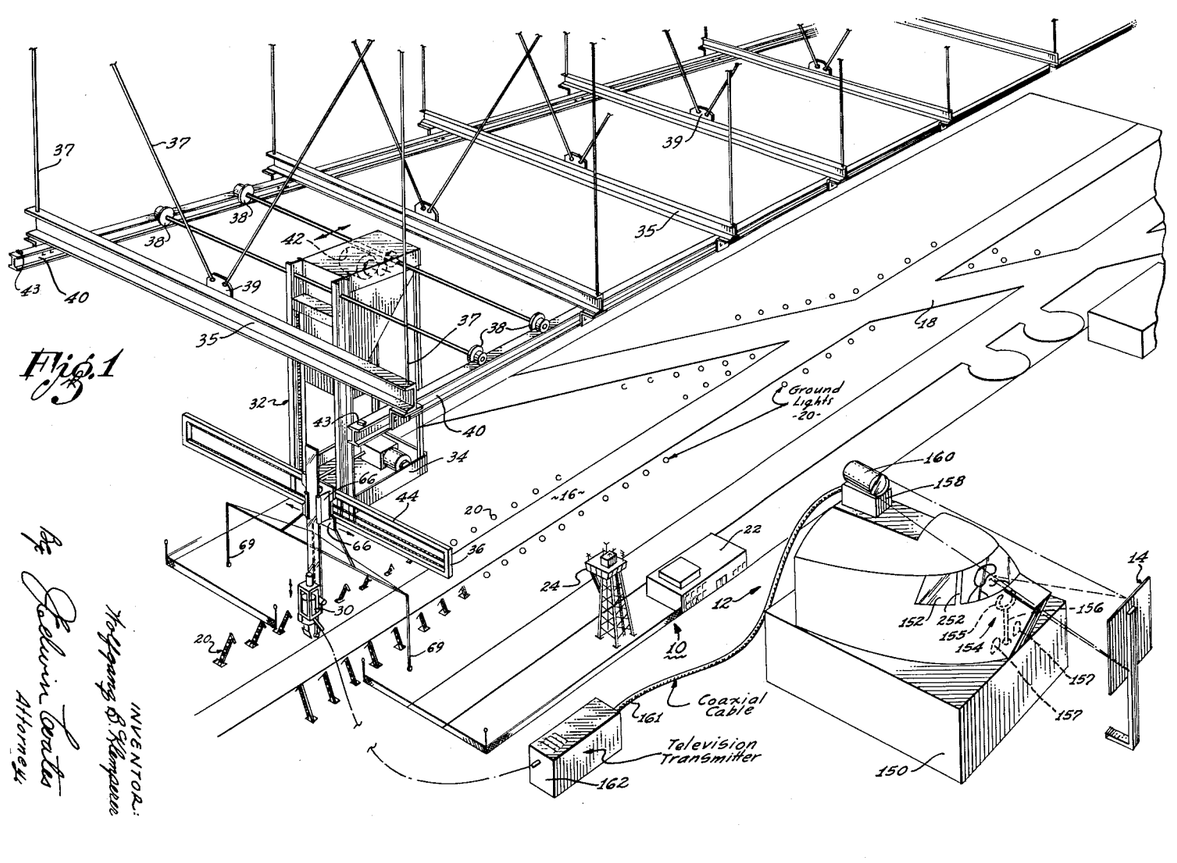
Figure 1 is a perspective view somewhat schematically illustrating one embodiment of the invention including a scaled-down model of an airport area, a closed-loop television system including a television camera for presenting to a pilot a view of the airport area, a simulated cockpit for accommodating the pilot and apparatus for moving the camera in accordance with the output of a computer responsive to the controls exerted by the pilot.

Figure 1 illustrates on a composite basis the apparatus constituting one embodiment of this invention. This apparatus includes a scaled-down model of ground terrain showing two-dimensional features and preferably also some three-dimensional features. The model may be made in the form of a two-dimensional map to facilitate easy roll-away and change of airports or other landscape areas. However, a three-dimensional architectural model gives an increased illusion of realism, especially when the different buildings, runways and other portions of the terrain are suitably colored or tinted to simulate actual conditions.

Preferably, the ground terrain includes an airport and the area crossed by an airplane as it approaches an airport for landing or after it leaves an airport on take-off. The reason for this is that critical problems encountered by a pilot in flight occur during landing or take-off. However, it should be appreciated that the terrain represented by the model may be any other area as well as an airport area. For example, the model may represent a seagoing aircraft carrier and the sea around the carrier.

The scaled-down landscape model may be disposed along any planar surface of a room or in any other relationship in the room. For example, the scaled-down model may be disposed on the floor of a room or even on the ceiling of a room. Preferably, the scaled-down landscape model is disposed along one of the vertical walls of a room in back of or alongside a simulated cockpit. The cockpit is disposed to face toward the front wall of the room so that the operator in the cockpit cannot see the scaled-down model directly.

In order to facilitate an understanding of the operation of this invention, a scaled-down landscape model generally indicated at 10 is shown in Figure 1 as being disposed along the floor of a room at a position in back of a cockpit generally indicated at 12. The cockpit 12 is disposed to face a screen 14 and the front wall (not shown) of the room. Although the scaled-down model 10 and the cockpit 12 are shown in Figure 1 as being in the same room, it should be appreciated that they may be disposed in different rooms or even in different buildings.

The model 10 may include various items forming a part of an airport and the area near the airport. For example, the model 10 may include various runways such as runways 16 and 18 and may also include boundary lights and direction indicators 20 disposed at spaced intervals along the runways. The model may tlso include such other items as airport terminal and administration buildings 22, a control tower 24 and even such other features as boarding and unloading stations for passengers and covered passageways leading from the airport terminals to the boarding stations.

The model may preferably be scaled down to approximately ⅓₀₀ of the actual size of a typical airport but actually other larger or smaller scale-down ratios may be used. In addition to the airport, a suitable approach area such as an area of approximately 2 miles may also be included when a model of the airport and its vicinity is to be represented. In such a scaled-down version, a flat board approximately 10 feet wide and 50 feet long may serve to mount the landscape model.

The model may be bounded by side curtains painted to represent clouds and distant scenery in a manner similar to that used in making motion pictures and television films. In this way, a camera viewing the model produces an image which appears to include an airport and the space surrounding the airport. The model may be floodlit to represent conditions of daylight. The lights 20 may be lit in an otherwise darkened room to simulate flights at night.

The model 10 may be movable relative to a stationary camera or the camera may be movable relative to the model or both the camera and the model may be movable. Preferably, a camera 30 is movable relative to a stationary model 10 since the camera can be moved more easily than the model. The camera 30 is mounted for such movement on a dolly generally indicated at 32 (Figure 1) in a manner which will be described in detail subsequently.

The dolly 32 has a frame 34 which is supported from above by a plurality of wheels 38 (Figure 1). The wheels 38 are adapted to roll along a pair of tracks 40 disposed in spaced parallel relationship above the model 10. The tracks 40 are laterally separated by a distance corresponding to the width of the model 10. The tracks 40 are supported at longitudinally spaced intervals by cross bars 35 which extend laterally between the tracks. Rods 37 extend upwardly into the ceiling from opposite ends of the cross bars 35 to support the cross bars and the dolly 32. Brackets 39 may also be disposed at intermediate positions on the cross bars 35 to support additional rods 37 which extend upwardly into the ceiling.

The dolly 32 is adapted to be driven along the tracks 40 by a motor 42, which may be coupled to a pair of the wheels 38 in the dolly 32 through gears (not specifically shown). Cams 43 may be disposed at opposite ends of the tracks 40 and may be associated with switches (not specifically shown) to actuate them as cut-out switches when the dolly 32 reaches the cams such that the electrical circuit to the motor 42 becomes broken. In this way, the dolly 32 is prevented from overtravel.

A pair of stanchions 44 (Figures 1 and 3a) extend horizontally from the frame 34 in perpendicular relationship to the tracks 40 and in spaced relationship to each other. A pair of lead screws 48 externally threaded as at 50 also extend horizontally from the frame 34 in parallel relationship to the stanchions 44 and at positions relatively close to the stanchions. Bevel gears 52 are disposed near the bottom of the shafts 48 and are in mesh with gears 54 mounted on a shaft 56. A worm gear 57 is also mounted on the shaft 56 and is in mesh with a worm 58 supported by a shaft 59. The shaft 59 is adapted to be driven by a motor 60 through gears (not specifically shown) disposed in a gear box 61.

Support blocks 64 (Figure 3) are disposed on the lead screws 48 and are provided with internal threads corresponding to the threads 50 on the lead screws so as to be movable along the lead screws as the lead screws rotate. A drift saddle 66 is attached to the blocks 64. The drift saddle 66 is so disposed relative to the stanchions 44 that the saddle is maintained in fixed positioning relative to the stanchions 44 and the shafts 48 in the vertical plane. Feelers 69 (Figure 1) extend downwardly from the drift saddle 66 at opposite ends of the drift saddle. The feelers 69 may constitute first contacts of switches which are adapted to be closed when the feelers touch the scaled-down model 10.

Tracks 68 are disposed on the drift saddle 66 at spaced positions along the drift saddle. The tracks 68 extend vertically in a direction perpendicular to the model 10. A carriage mount 70 (Figures 2 and 3) is slidable along the tracks 68 and is adapted to be driven by a motor 72 mounted on the carriage for slidable movement with the carriage. An externally threaded shaft 73 is disposed at one end in driven relationship to the motor 72.

Figures 2, 3, 3A:
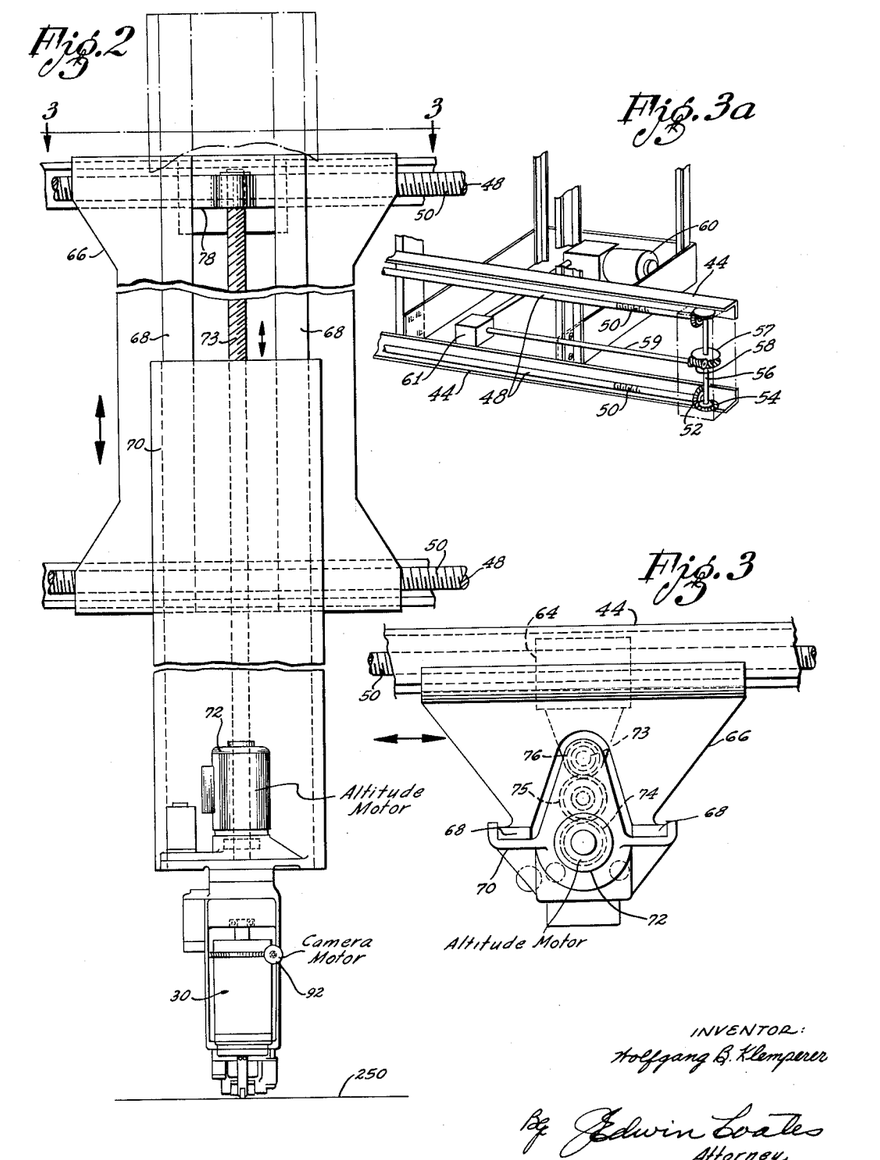
Figure 2 is an enlarged fragmentary side elevational view of the camera for viewing the model airport and apparatus associated with the camera for moving the camera in a direction to simulate changes in altitude and lateral disposition of an airplane.
Figure 3 is an enlarged fragmentary sectional view substantially on the line 3—3 of Figure 2 and illustrates in further detail the apparatus for moving the camera to simulate changes in altitude and lateral disposition of an airplane.
Figure 3a is a perspective view of apparatus for moving the camera in a direction for simulating lateral drift of the airplane with respect to the airport runway.

As shown in Figure 3, the shaft 73 may be driven by the motor 72 through a gear train including gears 74, 75 and 76. The gear train may also include other gears (not specifically shown) to drive the drift saddle at a speed considerably reduced with respect to the speed of the motor. As another alternative, the shaft 73 may be coupled to the motor 72 in driven relationship to the motor as by a chain. The shaft 73 is disposed at the other end in a guide support 78 which is internally threaded so that the shaft can screw into or out of the support in accordance with the operation of the motor 72.

A carriage 79 (Figure 4) is suitably supported by the carriage mount 70 at a position between the carriage mount and the model 10. Bearings 80 (Figure 4) are disposed between the carriage 79 and the carriage mount 70 to provide for a rotation of the carriage relative to the carriage mount. The carriage 79 is so mounted on the carriage mount 70 that it rotates on an axial line coincident with the optical axis of the camera 30 as a fucrum. The carriage 79 is adapted to be rotated by a motor 82 (Figures 4 and 5) through a gear train including gears 84, 86 and 88. Other gears (not specifically shown) may be included in the gear train to rotate the carriage 79 at a reduced speed with respect to the speed of the motor 82.

The camera 30 is supported by the carriage 70 and is adapted to rotate relative to the carriage on bearings 90 coacting between the camera and the carriage. The camera 30 is adapted to be rotated relative to the carriage as by a motor 92. Suitable gears may be included to couple the motor 92 and the camera 30 and to drive the camera at a proper speed.

Figure 7:
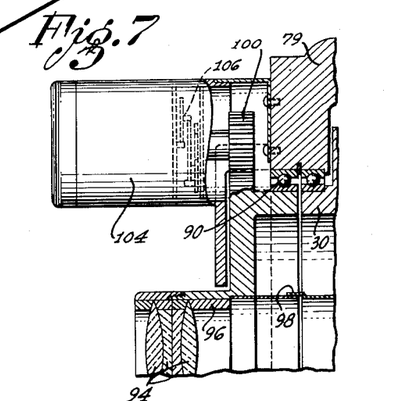
Figure 7 is an enlarged fragmentary sectional view substantially on the line 7—7 of Figure 6 and illustrates in further detail apparatus associated with the camera for simulating the angular movements of an airplane corresponding to angular movements of roll or banking and also illustrates apparatus associated with the camera for obtaining adjustments in the focus of the camera.

Lenses 94 (Figure 7) are supported within a sleeve 96 in axial alignment with the optical axis of the camera 30. The sleeve 96 extends to a position contiguous to a flange portion 98 on the camera 30 for rotation relative to the flange portion. The sleeve 96 is disposed within a flange portion of a gear 100 for rotary movement with the gear. The gear 100 is adapted to be driven by a motor 104 through a suitable gear train 106.

Figure 6:
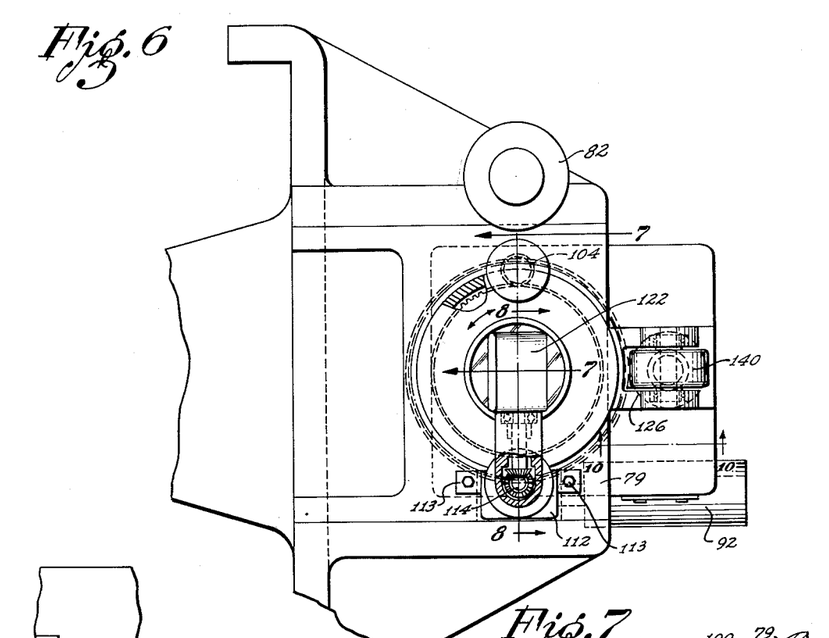
Figure 6 is an enlarged fragmentary front elevational view illustrating the camera and apparatus associated with the camera for simulating the angular movements of pitch and yaw of an airplane and also illustrating apparatus associated with the camera for simulating contact between the ground and the airplane wheels.
Figure 8:
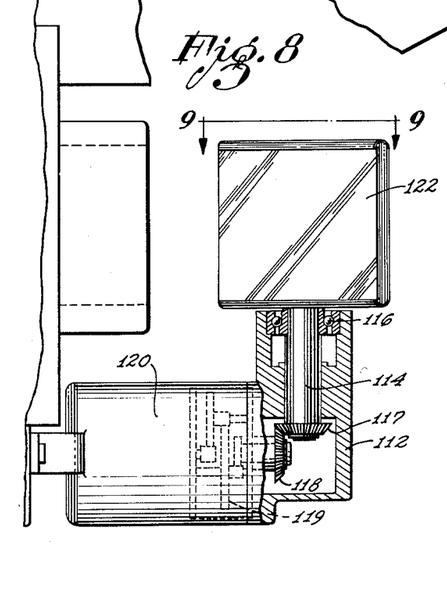
Figure 8 is an enlarged fragmentary sectional view substantially on the line 8—8 of Figure 6 and illustrates in further detail apparatus including a reflector associated with the camera for simulating the angular movements of an airplane corresponding to angular movements of pitch.
Figures 9, 10:
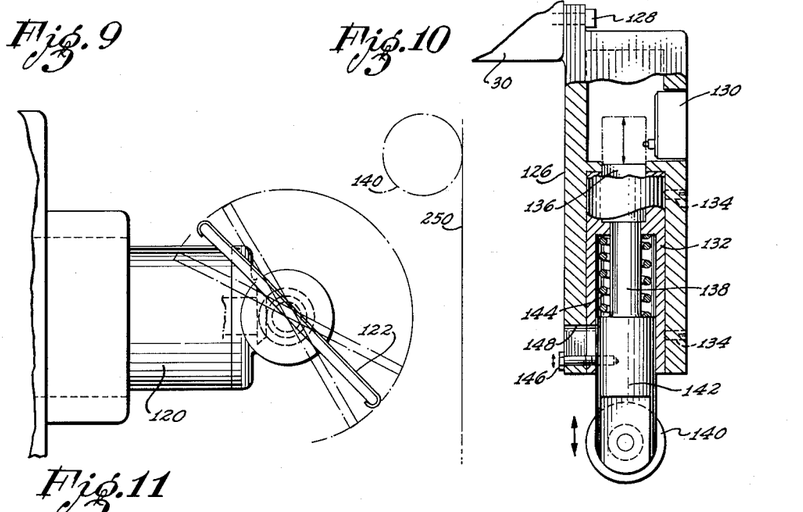
Figure 9 is an enlarged fragmentary sectional view of apparatus including the reflector associated with the camera for simulating by its angular position the pitch of an airplane and shows one angular position of the reflector in solid lines and two other angular positions of the reflector in broken lines.
Figure 10 is an enlarged sectional view substantially on the line 10—10 of Figure 6 and illustrates in some detail apparatus for simulating contact between an airplane wheel and the ground.

A housing 112 (Figures 6 and 8) is suitably attached as by screws 113 (Figure 6) to the carriage 79 for rotation with the carriage. A shaft 114 extends upwardly through the housing 112 and is rotatable on bearings 116 (Figure 8) supported within the housing. At its lower end, the shaft 114 carries a bevel gear 117 which is in mesh with a gear 118 driven through gears 119 by a motor 120 (Figures 8 and 9). At its upper end, the shaft 114 carries a light reflector such as a mirror 122. The mirror 122 is positioned between the lenses 94 and the model 10 so as to direct visual images from the model toward the lenses in accordance with the angular positioning of the mirror. As is well known, any angular change in the positioning of the mirror causes twice as much deflection of the field of view seen by the camera in the direction of pitch.

A hollow housing 126 (Figures 6 and 10) having a substantially cylindrical configuration is suitably supported as by screws 128 (Figure 10) to the camera 30. The housing 126 in turn supports at an upper position in the housing a limit switch 130 having a movable contact which extends into the housing. A retainer 132 is also supported within the housing 126 as by set screws 134 at a position below the limit switch 130.

At its upper end, the retainer 132 has a seat for receiving the actuator portion 136 of a shaft 138. The seat portion in the retainer 130 and the actuator portion 136 of the shaft 138 have non-annular configurations such as rectangular configurations to prevent the shaft from rotating within the seat. The actuator portion 136 of the shaft 138 is adapted to engage the movable contact of the limit switch 130 in one position of the shaft.

The shaft 138 extends downwardly through the housing 126 toward the model 10 to a position below the housing. A wheel 140 is supported by the shaft 138 at the bottom of the housing so as to contact and roll along the model 10 when the camera 30 is moved sufficiently close to the model. A spool portion 142 is provided on the shaft 138 at a position contiguous to the wheel 140. The spool portion 142 operates in conjunction with the seat portion of the retainer 132 to maintain a helical spring 144 under compression. By maintaining the helical spring 144 under compression, the spring acts to maintain the wheel 140 in firm contact with the model 10 at the times that the wheel is engaging the model. A regulating pin 146 is carried by the spool portion 142 of the shaft 138 and is slidable within slots 148 in the housing 126 and the retainer 130 to limit the movements of the shaft and the wheel 140 upwardly from the model 10 when the wheel contacts the model.

As previously described and as best seen in Figure 1, the cockpit 12 may be disposed in front of the model 10, the camera 30, the dolly 32 and their associated members or in some other relationship therefrom or even remotely therefrom. The cockpit may be mounted on a pedestal 150 to give an operator such as a pilot an illusion of height corresponding to that which he would have if he were in the cockpit of an airplane. The cockpit is provided with windows 152 to afford the pilot a forward view.

Control members generally indicated at 154 are provided in the cockpit 12 at a position immediately in front of the pilot. The control members 154 may include a control wheel 155 mounted on a column 156. The control column 156 may be operated in various ways such as toward or away from the pilot and the control wheel 155 may be turned in a manner corresponding to the control wheel of an airplane. These directions of movement of the control members 154 and the control wheel 155 correspond to the directions in which the control members in an airplane are moved for controlling the elevator and the ailerons. Rudder pedals 157 and throttles (not shown) are also provided as in a real airplane. Other control mechanisms, switches and buttons may also be provided.

In the embodiment of the invention shown in Figure 1, the screen 14 is mounted in front of the cockpit 12 so as to be viewed by the pilot through the window. The screen 14 is preferably opaque for reasons which will be described in detail subsequently. The screen 14 may be disposed at a particular distance such as 15 feet in front of the cockpit although other distances may be chosen as compromises, as will be described subsequently. A television receiver 158 is mounted adjacent to or on top of the cockpit 12 in the embodiment shown in Figure 1.

The receiver 158 is adapted to receive signals in accordance with the picture viewed by the television camera. These signals may be produced by scanning and transmitting apparatus associated with the camera 30, such scanning and transmitting apparatus being similar to that now used in television systems. A television transmitter 162 is shown in block form in Figure 1. Such scanning and transmitting apparatus is associated with the camera 30 in a manner not specifically shown in Figure 1 but known in the art. Although the transmitter 162 is shown in Figure 1 as being separated from the camera 30, the transmitter may actually be movable with the dolly 32.

The signals produced by the transmitter 162 are preferably transmitted to the receiver 158 through coaxial lines indicated at 161 in Figure 1 but they may also be transmitted on a wireless basis as by antennas. The signals received by the receiver 158 are introduced to a projector 160 mounted on the cockpit 12. The projector 160 is positioned to project the pictures toward the screen 14 with a minimum of parallax with respect to the eyes of the pilot. The projected pictures correspond to the visual images seen by the camera 30 and they appear like a real landscape to the pilot.

The distance of the projector 160 from the screen 14 is preferably so chosen that its relation to the distance of the pilot's eye from the screen is approximately in proportion to the ratio of the angular field covered by the camera to that encompassed by the camera. These ratios may be unity but it is convenient to encompass a somewhat larger field angle by the camera by means of a short focus lens than by the projector, which usually comprises a powerful Schmidt type of optics. This places the projector 160 conveniently aft of the pilot's seat.

Figure 11:
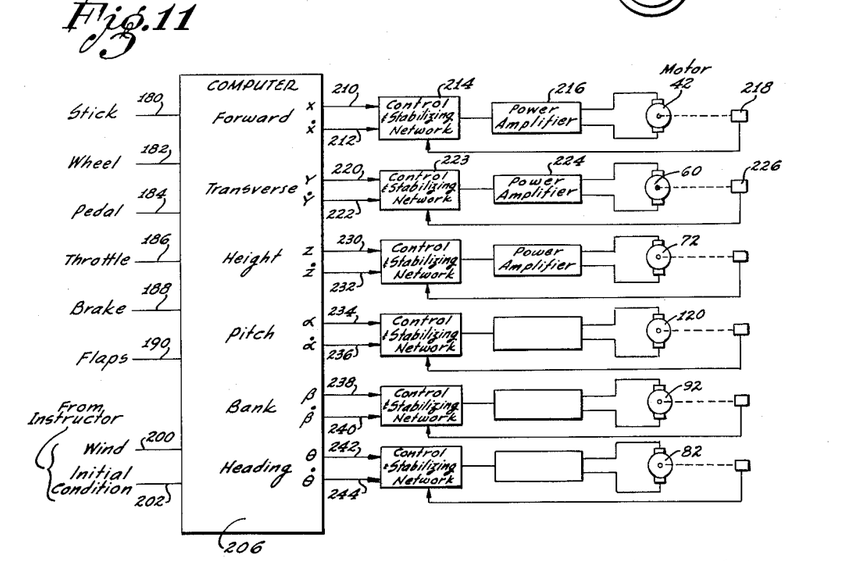
Figure 11 is a block diagram somewhat schematically illustrating an electrical system including a computer for converting the controls exerted by the pilot and the independent factors introduced by the instructor into changes in the view provided by the camera in various linear and angular modes to simulate the movements of an airplane.

Apparatus is shown in Figure 11 for controlling the movements of the camera 30. The apparatus shown in Figure 11 includes a servo system for producing electrical signals which are used to energize the motors shown in the previous figures and described above. When energized, these motors are operated to vary the visual image seen by the camera 30 in a manner similar to the change of the visual field that would be seen by a pilot flying a real airplane. It should be appreciated that the system need not be entirely electrical since various other systems such as hydraulic or pneumatic components can be included in the system. Various types of electrical servo systems can also be used.

By way of example, one embodiment of a servo system is shown in Figure 11. In the embodiment shown in Figure 11, the various controls are illustrated schematically. These controls produce different electrical signals on lines 180, 182, 184, 186, 188 and 190. For example, the signals are respectively introduced to the lines 180, 182, 184, 186, 188 and 190 in accordance with the operation by the pilot of various mechanisms including the control wheel 155, the control stick 156, the rudder pedals 157, the throttles and the brakes (not shown) and flaps (not shown).

Signals may also be independently introduced by the instructor on various lines including lines 200 and 202. These signals may represent certain conditions such as head and cross winds. The signals introduced by the instructor may also represent certain initial conditions such as the conditions initially presented to a pilot as he starts his simulated approach toward the airport represented by the scaled-down model 10.

The signals produced on the lines 180, 182, 184, 186, 188 and 190 and on the lines 200 and 202 are introduced to a computer indicated in block form at 206 in Figure 11. Although the computer 206 is shown in block form, a person skilled in the art should be able to construct a computer for receiving the signals on the various lines and for combining the signals to produce proper output signals when the control reactions of the airplane and its components and their mathematical relationships are made known to him. The computer 206 may operate either on an analog or a digital basis. When the computer operates on a digital basis, stages may be included to convert the output signals into an analog form.

The computer and associated networks and amplifiers may be physically installed, for example, beneath the cockpit 12 and the necessary conduitry established between the computer 206 and the various control motors for camera 30 and its support frame, and between the computer 206 and the control mechanisms within the cockpit.

The signals produced by the computer 206 may be introduced to pairs of output lines. For example, signals may be introduced to a pair of output lines 210 and 212. The signals introduced to the line 210 may represent the position determined by the computer 206 in the forward direction and the signals introduced to the line 212 may represent the speed determined by the computer in the forward direction. The signals on the lines 210 and 212 are introduced to control and stabilizing networks 214, the construction and operation of which will be apparent to persons skilled in the art.

The output signals from the networks 214 are introduced to a power amplifier 216. The signals from the amplifier 216 in turn pass to the coils of the motor 42 to control the operation of the motor. A transducer 218 is mechanically coupled to the motor 42 to produce signals in accordance with the operation of the motor at any instant. These signals are introduced back to the stabilizing networks 214 as feedbacks to control at any instant the output signals produced by the networks.

In like manner, signals are introduced to lines 220 and 222 at any instant to represent the lateral position and speed of the airplane as determined by the computer 206. Networks 223 and an amplifier 224 are electrically coupled to the lines 220 and 222 in a manner similar to the coupling between the lines 210 and 212 and the stages 214 and 216. The output from the amplifier 224 is introduced to the motor 60 to control the operation of the motor. A transducer 226 is mechanically coupled to the motor 60 to produce electrical signals for introduction to the networks 223 in accordance with the operation of the motor at any instant.

Lines 230 and 232, lines 234 and 236, lines 238 and 240 and lines 242 and 244 are also paired to receive signals from the computer 206. The lines 230 and 232 represent determinations by the computer as to the altitude and rate of change in altitude of the airplane at any instant. The signals introduced to the lines 234 and 236 represent determinations by the computer 206 as to pitch and the rate of change in pitch of the airplane at any instant. Similarly, the lines 238 and 240 receive signals from the computer 206 representing the bank and rate of change in bank of the airplane at any instant. Signals representing the determination by the computer as to the heading and rate of change in heading of the airplane at any instant are introduced to the lines 242 and 244. Stages corresponding to the stages 214, 216 and 218 are associated with the paired lines 230 and 232, the paired lines 234 and 236, the paired lines 238 and 240 and the paired lines 242 and 244.

Because of the positioning of the mirror 122, a light image representing a portion of the model 10 is reflected by the mirror through the lenses 94 (Fig. 7) to the camera 30. The particular portion of the model 10 viewed by the camera 30 is dependent upon the disposition of the camera relative to the model 10 and upon the disposition of the mirror 122 relative to the model and the camera. This will be described in detail subsequently. The visual image introduced to the camera 30 is converted by the transmitter 162 into a corresponding pattern of electrical signals by techniques of electronic scanning used in the field of television.

The electrical signs representing the light image introduced to the camera 30 are transmitted either through the coaxial lines 161 or by a radio beam to the receiver 158. The receiver 158 operates to decode these electrical signals in a manner similar to that performed by television receivers in the home or by industrial receivers so as to reproduce an image corresponding to the light image seen by the camera 30. This light image is projected by the projector 160 toward the screen 14. The screen 14 is disposed in front of the cockpit 12 so that the pilot is able to see the image on the screen as he looks forward through the windows 152 in the cockpit. The screen 14 may be either flat or curved.

The pilot operates the control wheel 155, the control stick 156, the pedals 157 and the throttles in accordance with his reaction to the image presented on the screen 14 just as he would do while flying a real airplane. For example, the image presented on the screen 14 may give the illusion to the pilot that he is somewhat to the right of the proper position for approaching the runway 16. The pilot may then operate the control wheel 154 as though to produce a banking movement. Thereupon the computer will compute the ensuing banking and veering history of the airplane. The camera drives will follow suit with due lag and response. The camera will successively see the landscape model at different bank angles and gradually be directed to different headings, while still moving forward at appropriate approach speed. The picture on the screen will appear to the pilot as banking in the opposite direction and it will gradually move across his field of view all the while the perspective of the features of the airport change so as to give a realistic impression of a turning approach maneuver. In this way, a convincing illusion of flight is presented to the pilot.

Various types of adjustments can be made by the pilot or instructor in accordance with his operation of the control wheel 155 and the other control mechanisms. For example, the motor 42 may be normally operated at a particular speed to simulate the crusing speed of an airplane. When the motor 42 operates at the particular speed, it drives the wheels 38 at a related speed and causes the dolly 32 to move at this related speed along the tracks 40. At one instant, the dolly 32 may have the position shown in Figure 1, and at another instant the dolly may have a position to the right of the position shown in Figure 1. As the dolly 32 moves along the tracks 40, different images are presented to the camera 30. These different images correspond to the different images seen by a pilot as an airplane moves in a forward direction such as toward the runway 16.

At particular times, the pilot may desire to decrease the speed of an airplane. He may do this by operating the proper mechanisms such as the control stick 156 or the throttle mechanism to simulate any decrease in airplane speed. This causes signals related to the operation of the control mechanisms to be introduced to the computer 206 for the conversion by the computer into proper signals in accordance with the construction and programming of the computer. The output signals from the computer 206 are introduced to various lines including the lines 210 and 212. These signals represent the determinations by the computer 206 as to the longitudinal position of the airplane and the rate of change in such position.

The signals on the lines 210 and 212 are introduced to the networks 214, which combine the signals to produce a resultant output signal. The resultant output signal from the networks 214 is amplified and then introduced to the motor 42 to control the operation of the motor. This produces an adjustment in the speed at which the motor 42 drives the dolly 32 along the tracks 40. For example, the motor 42 drives the dolly 32 at a reduced speed when the throttle mechanism in the cockpit 12 is operated to simulate a reduction in the speed of an airplane.

The motorf 42 drives the transducer 218 as well as the dolly 32. The transducer 218 in turn produces signals at any instant in accordance with the speed at which it is driven by the motor 42. The signals produced by the transducer 218 at any instant are introduced to the network 214 to vary the signals which are produced by the network and which are introduced on an amplified basis to the motor 42. In this way, the network 214, the amplifier 216, the motor 42 and the transducer 218 operate on a closed loop basis as a servo system to vary the operation of the motor 42 at any instant in accordance with the changes produced by the motor in the previous instant. As a result, the dolly 32 is moved in the forward direction at any instant in accordance with the operation of the various mechanisms including the control stick 156.

It will be seen that variations in the forward speed of an airplane with respect to runway 16 can be obtained in different ways. For example, the forward speed of an airplane can be varied by imparting a component of speed to the airplane in vertical or lateral directions even while the total speed of the airplane remains constant. Because of this, changes in pitch and yaw of the airplane produce variations in the signals introduced to the computer 206 and cause variations to be obtained in the signals which are produced by the computer for introduction to the lines 210 and 212. The signals from the computer 206 produce variations in the operation of the motor 42 so as to cause the speed of the dolly 32 along the tracks 40 to be correspondingly varied.

In like manner, the system shown in Figure 11 is adapted to vary the visual image seen by the camera 30 in the other degrees of movement. For example, when the different control mechanisms are actuated, signals may be introduced to the computer 206 such that output signals are introduced by the computer to the lines 220 and 222. The signals on the lines 220 and 222 are introduced to the control and stabilizing networks 223, which operate upon the signals to produce output signals for introduction to the amplifier 224. The amplified signals are then introduced to the motor 60 to control the operation of the motor.

When the motor 60 becomes energized, it drives the bevel gears 54 through the gears in the gear box 61, the worm 58 and the worm gear 57. The bevel gears 54 in turn drive the bevel gears 52 and the lead screws 48. As the lead screws 48 rotate, the blocks 64 move horizontally on the shafts since the blocks are internally threaded in a manner similar to the external threads on the shafts. The blocks 64 move toward the left in Figures 1 and 3a upon the rotation of the shafts in one direction and move toward the right upon the rotation of the shafts in the opposite direction.

The saddle 66 moves with the blocks 64 and carries the carriage mount 70, the carriage 79 and the camera 30 with it. This causes the camera 30 to move horizontally in a lateral direction relative to the model 10. As will be seen, a horizontal movement of the camera 30 corresponds to a lateral displacement of the visual image seen by the camera. For example, movement of the camera 30 toward the left in Figures 1 and 3a corresponds to a drift of an airplane toward the left. In this way, the pilot sitting in the cockpit 12 is able to correct by proper operation of the control mechanisms for lateral displacements in his flight pattern from the desired position.

The pilot is also able to adjust the distance from which the camera 30 views the model 10. This distance is represented by the vertical distance between the model 10 and the camera 30 and is equivalent on a scaled-down basis to the altitude of an airplane. The scaled-down altitude between the model 10 and the camera 30 can be adjusted by proper operation of the various control mechanisms. When the altitude of the camera 30 is to be varied, signals are introduced by the computer 206 to the lines 230 and 232 in accordance with the operation by the pilot of the proper control mechanisms. These signals are then converted by networks corresponding to the networks 214 into proper signals for introduction to the motor 72 (Figures 2 and 3).

As the motor 72 operates, it drives the shaft 73 through the gears 74, 75 and 76 (Figure 3). Since the shaft 73 is externally threaded, it moves vertically in the guide support 78 (Figure 2) as it rotates. The shaft 73 moves upwardly away from the model 10 as it rotates in one direction, the position of the model being indicated schematically at 250 in Figure 2. The shaft 73 moves downwardly toward the model 10 as it rotates in an opposite direction. Means such as cams and switches may be included to stop the motor 72 so as to limit the movements of the shaft 73 either upwardly or downwardly or in both directions.

The carriage mount 70 moves with the shaft 73 as the shaft moves upwardly or downwardly with respect to the model 10. The camera 30 and the mirror 122 in turn move with the carriage mount 70 so as to become adjusted vertically in position relative to the model 10. In this way, the camera 30 views the model 10 in the same relationship as previously except at a different distance. This is equivalent to varying the height of an airplane above the ground without otherwise affecting the linear position or angular altitude of the airplane.

The visual image presented to the camera 30 can also be varied in three degrees of angular movement. In one degree of angular movement, the motor 92 rotates the camera 30 (Figures 4 and 5) by driving the camera through the coupling gears. The motor 92 drives the camera 30 in one angular direction or in an opposite angular direction when an error voltage of one polarity or an opposite polarity is presented to the motor. Only the camera 30 is rotated by the motor 92 and not the mirror 122. The camera 30 is rotated by the motor 92 in accordance with the signals introduced by the computer 206 to the lines 238 and 240.

The camera 30 is rotated by the motor 92 about the optical axis of the camera. Since the camera 30 rotates on its optical axis, it sees the same portion of the model 10 but canted at a bank angle. For example, if the camera 30 is rotated through an angle of 180 degrees, the camera would see the same visual image as formerly but inverted with respect to the original presentation. This corresponds to a roll movement of an airplane since such movements involve a rotation of the visual image presented to the airplane.

Figure 4:
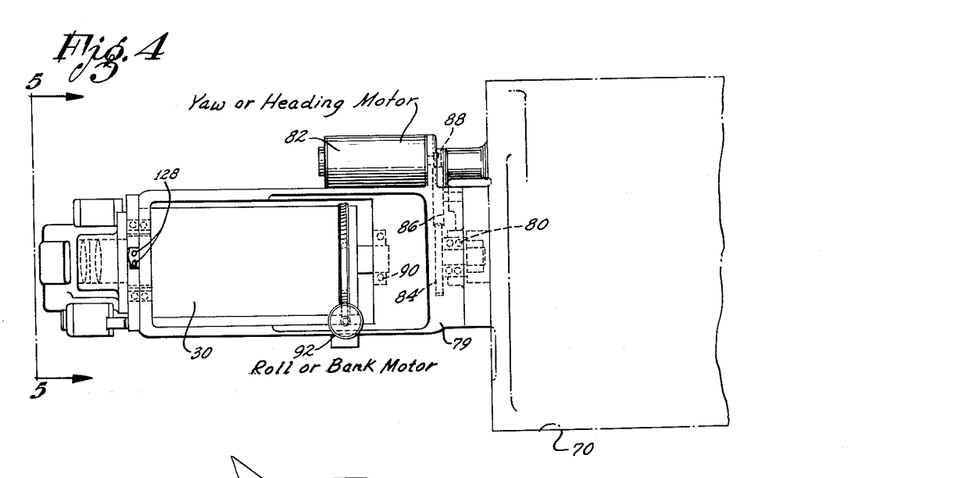
Figure 4 is an enlarged fragmentary view as seen from a position similar to that shown in Figure 2 and illustrates the camera and apparatus associated with the camera for rotating the camera to simulate an angular movement of the airplane designated as roll or banking and for rotating the camera and a reflector associated with the camera to simulate an angular movement of the airplane involving changes in yaw or heading.
Figure 5:
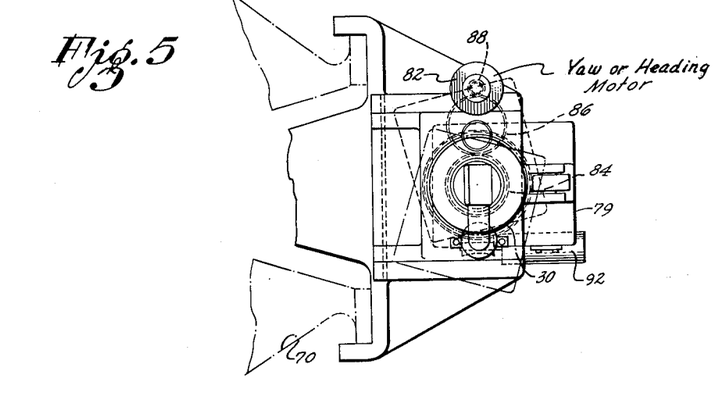
Figure 5 is an enlarged fragmentary sectional view substantially on the line 5—5 of Figure 4 and illustrates in further detail the apparatus for simulating roll and changes in heading and shows certain members in one position in solid lines and in two other positions in broken lines.

The motor 82 in Figures 4 and 5 is adapted to rotate the carriage 79 on an axis corresponding to the optical axis of the camera 30. The motor 82 is adapted to rotate the carriage 79 through a gear train including the gears 84, 86 and 88. Since the camera 30 and the mirror 122 are supported by the carriage 79, the camera and the mirror rotate with the carriage. The motor 82 rotates the camera 30 and the mirror 122 in a first direction or in an opposite direction in accordance with the signals introduced by the computer 206 to the lines 242 and 244.

The camera 30 rotates in a plane substantially parallel to the model 10 and substantially perpendicular to the optical axis of the camera. Since the mirror 122 moves with the camera 30, it rotates in the same plane. This causes the mirror to rotate without moving horizontally or vertically along the model 10 except for such movements as are produced by the forward speeds of the airplane. By rotating the mirror 122 the mirror is able to pick up different lateral portions of the model 10 within a particular longitudinal portion of the model. These different lateral portions of the model 10 correspond to a lateral sweep of the terrain in an airplane.

Only a lateral sweep of the terrain is produced by a rotation of the camera 30 and the mirror 122 since such a rotation does not present to the mirror a different portion of the model in a longitudinal direction along the model. In this way, rotary movements of the camera 30 and the mirror 122 simulate the yaw of an airplane because of the fact that a lateral sweep of the forward area is presented to the pilot in an airplane as the plane undergoes angular movements of yaw.

The motor 120 in Figures 8 and 9 operates to simulate variations in the pitch of an airplane. The motor 120 operates through the gear train 119 to rotate the bevel gear 118, which in turn drives the bevel gear 117, the shaft 114 and the mirror 122. The motor 120 rotates the mirror 122 in one direction or in an opposite direction in accordance with the operation at the control mechanisms by the pilot and the resultant introduction of signals by the computer 206 to the lines 234 and 236.

As will be best seen in Figures 8 and 9, the mirror 122 pivots on its axis when it is rotated by the motor 120. This axis is substantially parallel to the model 10. As a result, one end of the mirror 122 moves close to the model 10 and the other end of the mirror moves farther away from the model 10 by a corresponding distance. This causes the mirror 122 to reflect to the lens system 94 and the camera 30 a different portion of the model 10 in the longitudinal direction. Only variations in the longitudinal direction along the model 10 and no variations in the lateral direction along the model are produced by a rotation of the mirror 122 on its axis. This is equivalent to an angular movement of an airplane corresponding to pitch since the pilot in the airplane sees different portions of the landscape directly ahead of him without any lateral deviations in the view when he subjects the plane to angular movements of pitch.

By varying the visual image in three substantially perpendicular degrees of linear movement and three substantially perpendicular degrees of angular movement, any type of variations corresponding to movements of an airplane can be obtained. These variations in the visual image are produced primarily in accordance with the operation of the controls by the pilot. It should be appreciated, however, that variations in the visual image presented to the camera 30 can also be introduced by external means. For example, an error voltage can be introduced to the motor 60 in Figure 3a to produce movements of the camera 30 laterally along the model 10 and to produce such movements independently of any controls exerted by the pilot. These independent movements of the camera 30 may represent such phenomena as cross winds which may be inserted by the navigator or instructor as a separate input to the computer. Initial conditions may also be inserted by the instructor into the computer 206 to control the initial movement of the camera in the various degrees of freedom. These initial conditions would represent the speed of the airplane in the various linear and angular directions at the time that the pilot is starting his trial run.

Independent operations of the motor 72 may also be introduced to produce movements of the camera 30 toward or away from the model 10. These movements of the camera 30 may correspond to vertical gusts of an airplane from air turbulence. Other movements of an independent nature may be introduced to the camera 30 or to the mirror 122 to represent various conditions. These independent phenomena may be either constant in their effect or may vary over considerable ranges at different periods of time without any mathematical relationship to the variations to simulate instantaneous changes of such phenomena as weather conditions.

The focus of the lenses 94 can also be adjusted in synchronism with the movements of the camera 30 in the various linear and angular directions. The focus of the lenses 94 can be adjusted in accordance with the signals introduced to the computer 206. The computer would then operate to introduce signals to a pair of lines corresponding to the lines 210 and 212. The signals would then be converted and amplified by stages corresponding to the stages 214 and 216 so as to produce output signals for controlling the operation of the motor 104. In this way, the camera 30 can receive reasonably sharp images of the middle ground at any instant regardless of its positioning with respect to the model 10. For optimum balance of foreground and background, the lens can be tilted in a forward direction to alleviate differences in focus between near and distant objects in the model 10 as seen by the camera. This is a technique which is known in other photographic fields and can easily be adapted for operation in this invention.

The apparatus described above simulates an angular movement of an airplane in roll by rotating the camera 30 and simulates an angular movement of an airplane in yaw by simultaneously rotating the camera 30 and the mirror 122. Actually, it would be possible to produce a rotary movement of the camera 30 independently of any rotary movement of the mirror 122 to simulate changes in yaw or heading. This could be accomplished by a proper construction and programming of the computer 206. Under such circumstances, the computer would provide first signals to rotate the camera 30 and second signals to rotate the mirror 122 when changes in yaw or heading are to be produced.

When the apparatus constituting this invention is modified as described in the previous paragraph, means would have to be provided in the computer so that some delineation could be obtained between rotary movements of the camera 30 to simulate roll and rotary movements of the camera to simulate changes in heading. For example, the computer would have to subtract the total rotary movements of the camera 30 from the rotary movements of the camera simulating roll to obtain the movements simulating changes in heading.

The apparatus constituting this invention must accurately simulate the movements of an airplane in accordance with the controls exerted by the pilot and the conditions independently inserted by the instructor. In order to provide such accurate movements, the various components in the apparatus should have a minimum amount of backlash and should have a minimum play between various parts. The drive from one part to the next should be precise and rigid. It is believed that a person skilled in the art would be able to construct such apparatus from the above description.

The apparatus shown in the drawings and described above is also able to simulate the actual contact of the airplane wheels with the ground during landing and the actual removal of the wheels from the ground during take-off. The actual contact of the airplane wheels with the ground is simulated when the wheel 140 in Figure 10 engages the model 10. Upon an engagement between the wheel 140 and the model 10, the wheels are pressed upwardly into the housing 126 against the action of the spring 144. The upward movement of the wheel 140 is limited by the height of the slots 148 since the pin 146 is slidable in the slots. By making the height of the slots 148 sufficiently small, the wheel 140 is prevented from contacting the housing 126 at all times so as to forestall any possibility of making the wheel skid. It should be appreciated, however, that wheel skids can be simulated by the inclusion of various mechanisms such as a brake pivotable into engagement with the wheel 140 upon the actuation of a switch.

Since the shaft 138 moves upwardly into the housing 126 upon an engagement between the wheel 140 and the model 10, the actuator portion 136 of the shaft engages the movable contact of the switch 130 when the pressure exerted by the model on the wheel is sufficiently great. This causes the switch 130 to be changed from a state of opening to a state of closure. It should be appreciated that the switch 130 can also be changed by the actuator portion 136 of the shaft 138 from a state of closure to a state of opening.

When the switch 130 becomes closed, certain operations may be initiated. For example, noises may be produced during practice landings to simulate those produced when the wheels of an airplane contact the ground. Noises may also be produced to simulate the roar of the engines as the pitch of the propellers is reversed and power is applied to slow down the aircraft. Independent voltages may also be introduced to the motor 42 of such a polarity that the movement of the dolly 32 along the track 40 decreases in speed when the brakes are used.

The feelers 69 are also adapted to indicate when the wheels of the simulated airplane contact or leave the ground. For example, when the feelers 69 contact the model 10 to simulate contact between the airplane wheels and the ground, switches formed in part by the feelers may become closed. Upon the closure of the switches, circuits may become energized for performing such functions as decreasing the movements of the dolly 32 and producing simulated landing noises.

Various cams and limit switches may be included in the system to perform different functions. For example, the cam 43 (Figure 1) and associated switches may be included to stop the motor 42 so as to prevent the dolly 32 from running off the tracks 40. The cam 43 and the associated switches may also be included to energize alarm circuits for indicating that the pilot would have crashed his plane into rear barriers of the airport in an actual flight.

A second cam and second associated switches may be included to indicate whether the pilot would have landed on or off a particular runway such as the runway 18. As another illustration, a third cam and third associated switches may be included to indicate whether or not the pilot would have landed on a designated portion of the runway, such portion being considered as the optimum portion for landing a particular type of airplane.

Other types of apparatus can also be included. For example, apparatus can be included to raise or lower the cockpit. Such vertical movements of the cockpit can simulate the buffeting presented to the pilot during rough weather. If the projector is also mounted on the cockpit, the picture projected on the screen for viewing by the pilot would continue to simulate correctly. If the camera is not mounted on the cockpit, it would remain stationary as the cockpit moved. Under such conditions, compensating information would have to be introduced to the computer 206 to vary the picture presented to the pilot in a manner similar to that which would be produced if the projector moved with the cockpit.

Various other techniques can be used to increase the simulation of actual conditions. For example, a backdrop can be varied to simulate the movement of an airplane from the landing field into the clouds and the subsequent movement of the airplane through the clouds to a position above the clouds. Smoke can also be introduced between the camera 30 and the model 10 to simulate fog. Lights can also be placed on the camera to simulate the search lights of an airplane during night flying.

The apparatus described above operates to move the camera on the basis of rectangular co-ordinates for a simulation of an actual flight pattern under the control of the pilot. The apparatus can also control the movements of the camera on the basis of a polar co-ordinate. In such a system of absolute polar co-ordinates, the movement of the camera would be tangential to the flight path at any instant. The path of movement of the airplane at any instant would be similar to that steered in an automobile.

The use of absolute polar co-ordinates may be especially important under circumstances where more than one pilot is being tested by controls in different cockpits in the same room. Under such circumstances, each pilot would not see the movements of the dolly 32 operated by the other pilot. This would be important in insuring that each pilot would be flying his airplane on a simulated basis without undue interference and distractions.

It should be appreciated that the apparatus shown in Figures 1 to 11, inclusive, and described above is intended to be only by way of illustration. For example, other types of apparatus and different types of construction can be used for the dolly 32. As another illustration, the drift saddle 66 need not be constructed in the specific manner described above and shown in the drawings so long as it is able to carry the camera 30 in an upward direction without any lateral or longitudinal errors.

In the embodiment shown in Figure 1, the visual image from the projector 160 is directed toward the screen 14 from a position above the cockpit. Since the projection is directly toward the screen 14, a minimum amount of light is lost so that the visual image seen by the pilot in the cockpit 12 has an optimum brightness. This is especially important when the screen 14 is displaced a considerable distance from the cockpit 12. Displacing the screen 14 at an increased distance from the cockpit 12 is desirable within certain limits since it tends to increase the illusions of reality to the pilot.

Displacing the screen 14 at an increased distance from the cockpit 12 also tends to diminish problems of parallax. These problems occur because the window posts such as the posts 252 in the cockpit give the pilot a three-dimensional conception of distance which is different from the conception of distance produced on the pilot as he looks at the screen 14. This results from the fact that the window posts 252 appear to move over the landscape viewed by the pilot on the screen 14 as the pilot moves his head.

Figure 12:
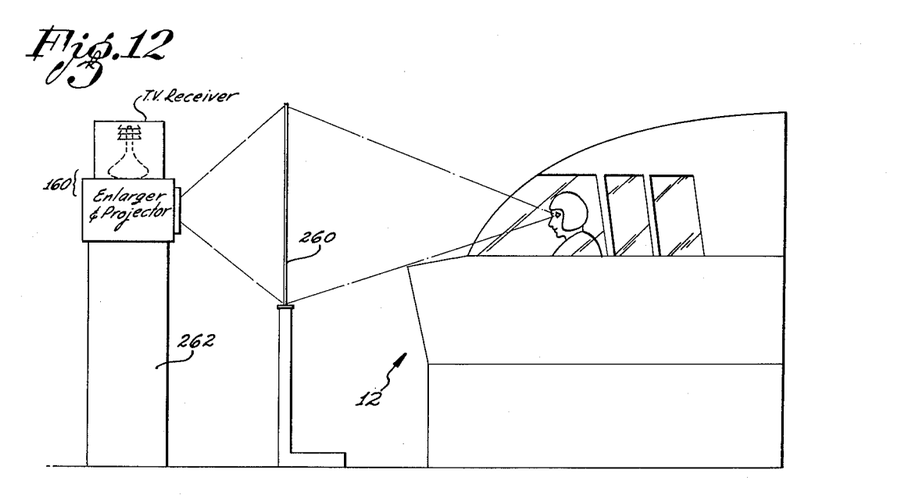
Figure 12 is an enlarged elevational view of another embodiment of the invention including a simulated cockpit, a transparent screen and apparatus for projecting a picture toward the back side of the screen for viewing by the pilot on the front side of the screen.

In the embodiment shown in Figure 12, problems of parallax are further eliminated. This embodiment includes a translucent screen 260. The cockpit 12 is disposed on one side of the screen 260 and the projector 160 is mounted on a pedestal 262 on the other side of the screen. The projector 160 directs the visual image toward the screen 260 along an extension of the same line of sight as the line of sight from the pilot to the screen. This visual image is seen by the pilot on the screen 260 since the screen is translucent. In this way, the pilot is able to see the visual image on the screen 260 without any parallax or distortion and with the projector 160 disposed completely out of the way of the pilot.

Figure 13:
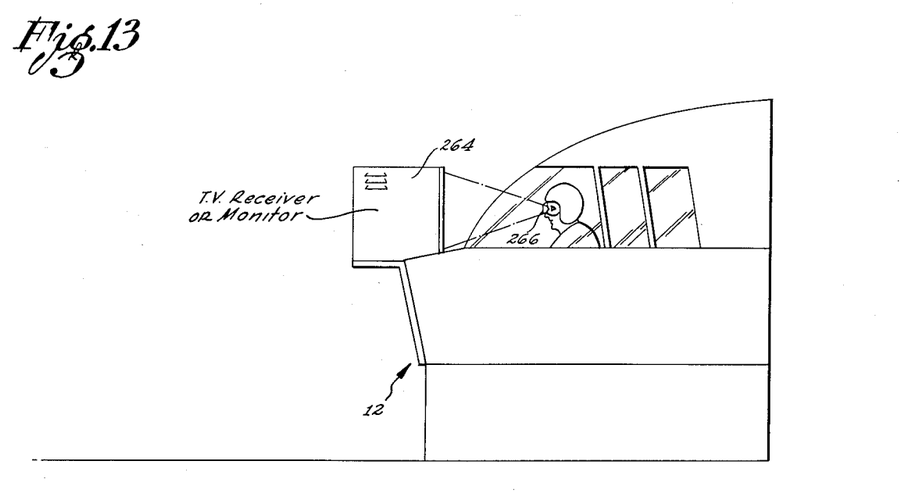
Figure 13 is an enlarged elevational view of another embodiment of the invention including a simulated cockpit and a television receiver disposed directly in front of the cockpit so that the pilot can directly view the pictures in the receiver.

In the embodiment shown in Figure 13, the screen is disposed a relatively short distance such as 3 or 4 feet in front of the cockpit 12. It may be the screen of a closed tube television set such as a set 264. Under normal conditions, this, however, would require the pilot to accommodate his eyes to the near distance and would tend to destroy the illusion of a real landscape as seen from a distance. To obviate this, special goggles 266 are worn by the pilot. Each lens in the goggles 266 is provided with an upper portion having a positive optical power and slight prismatic power to compensate for accommodation and binocular parallax and thus create the illusion of infinity. Each lens in the goggles 266 also has a lower plano portion inducing the pilot to focus and converge his eyes when he looks down at the various indicators on the instrument panel. In this way, the advantages of realistic presentation can be reproduced in a relatively small space and without large screen projection optics.

I claim:

1. In combination for simulating the flights of an airplane over terrain as represented by a model of the terrain and for simulating such flights in accordance with controls exerted by an operator such as a pilot, including a windowed cockpit having simulated means therein over which the pilot exerts control of the flight, a screen external of the cockpit and viewable from therewithin, means including a camera for viewing the model to provide a visual image on the screen, first motor means for moving the camera linearly in three substantially perpendicular directions corresponding to longitudinal, lateral and altitudinal changes in the position of the airplane, second motor means for moving the camera angularly in a first direction corresponding to angular movements in roll of the airplane, a reflector disposed between the camera and the model, third motor means for angularly moving the camera and the reflector in a second direction corresponding to the said first direction thereby effectively rotating the optical axis of the camera in accordance with angular changes in heading of the aircraft and corresponding to angular changes in heading of the airplane, fourth motor means for angularly moving only the reflector in a third direction transverse to the first and second angular directions and corresponding to angular movements in pitch of the airplane, and means including computer and servomechanism operating means for energizing the first, second, third and fourth motor means in accordance with the controls exerted by the pilot to vary the visual image presented to the camera.

2. In combination for simulating the flights of an airplane over terrain as represented by a model of the terrain and for simulating such flights in accordance with the controls exerted by an operator such as a pilot, including, a dolly movable along the model in a direction corresponding to the longitudinal movements of the airplane, a drift saddle movable along the model on the dolly in a direction for simulating lateral drift of the airplane, a carriage movable on the drift saddle in a direction toward or away from the model to simulate altitudinal movements of the airplane, a television camera supported on the carriage for receiving visual images representing a portion of the model dependent upon the positioning of the dolly, the drift saddle and the carriage, a reflector disposed between the camera and the model to direct the visual images from the model toward the television camera, means including a television transmitter for converting the visual image seen by the camera into corresponding electrical signals, means including a television receiver for converting the transmitted signals into a corresponding visual image and for projecting the visual images seen by the camera into the field of view of the pilot for the exertion of controls by the pilot in accordance with the visual images seen by the pilot, means including a computer and servomechanism means for moving the dolly in accordance with the controls exerted by the pilot to simulate forward movement of the airplane, means including the computer and servomechanism means for moving the drift saddle in accordance with the controls exerted by the pilot to simulate lateral movements of the airplane, means including the computer and servomechanism means for moving the carriage in accordance with the controls exerted by the pilot to simulate altitudinal movements of the airplane, means including the computer and servomechanism means for rotating the camera in accordance with the controls exerted by the pilot to simulate changes in roll of the airplane, means including the computer and servomechanism means for rotating the camera and the reflector in accordance with the controls exerted by the pilot to simulate changes in yaw of the airplane, and means including the computer and servomechanism means for pivoting the reflector in accordance with the controls exerted by the pilot to simulate changes in pitch of the airplane.

3. In combination for simulating the flights of an airplane over terrain as represented by a model of the terrain and for simulating such flights in accordance with controls exerted by an operator such as a pilot, including, first motor means including a dolly for moving the dolly along the model in a direction to simulate the longitudinal movements of the airplane, second motor means including a drift saddle supported by the dolly for moving the drift saddle on the dolly in a direction to simulate the lateral movements of the airplane, third motor means including a carriage supported by the drift saddle for moving the carriage on the drift saddle in a direction to simulate the altitudinal movements of the airplane, a camera supported by the carriage with its optical axis substantially perpendicular to the model, fourth motor means for pivoting the camera on the optical axis of the camera to simulate the roll of the airplane, a reflector disposed between the camera and the model to direct toward the camera a visual image representing a portion of the model, fifth motor means for rotating the reflector and the camera in a plane substantially parallel to the model to simulate the yaw of the airplane, sixth motor means for pivoting the reflector on an axis substantially perpendicular to the model to simulate the pitch of the airplane, means including a television receiver and projector for directing the visual image seen by the camera into the field of view of the pilot for the exertion of controls by the pilot in accordance with the visual image seen by the pilot, and means including a computer and first, second, third, fourth, fifth and sixth control means for respectively providing for the introduction of signals to the first, second, third, fourth, fifth and sixth motor means to obtain an adjustment in the visual image received by the camera in accordance with the computations resulting from the controls exerted by the pilot.

4. The combination as set forth in claim 3 in which first, second, third, fourth, fifth and sixth transducer means are respectively coupled to the first, second, third, fourth, fifth and sixth motor means to produce signals at any instant corresponding to the operation of their associated motor means and in which the signals from the first, second, third, fourth, fifth and sixth transducer means are respectively introduced to the first, second, third, fourth, fifth and sixth control means to introduce corresponding variations introduced by each of the control means to the associated motor means.

5. In combination for simulating the flights of an airplane over terrain as represented by a model of the terrain and for simulating such flights in accordance with the controls exerted by an operator such as a pilot, including, a dolly movable along the model in a direction corresponding to the longitudinal movements of the airplane, a drift saddle movable along the model on the dolly in a direction for simulating lateral drift of the airplane, a carriage movable on the drift saddle in a direction toward or away from the model to simulate altitudinal movements of the airplane, a television camera supported on the carriage for receiving visual images representing a portion of the model dependent upon the positioning of the dolly, the drift saddle and the carriage, a reflector disposed between the camera and the model to direct the visual images from the model toward the television camera, means including a television transmitter for converting the visual image seen by the camera into corresponding electrical signals, means including a television receiver for converting the transmitted signals into a corresponding visual image and for projecting the visual images seen by the camera into the field of view of the pilot for the exertion of controls by the pilot in accordance with the visual images seen by the pilot, means including computer and servomechanism means respectively moving the dolly in accordance with the controls exerted by the pilot to simulate forward movement of the airplane, moving the drift saddle in accordance with the controls exerted by the pilot to simulate lateral movements of the airplane, moving the carriage in accordance with the controls exerted by the pilot to simulate altitudinal movements of the airplane, rotating the camera in accordance with the controls exerted by the pilot to simulate changes in roll of the airplane, rotating the camera and the reflector in accordance with the controls exerted by the pilot to simulate changes in yaw of the airplane, pivoting the reflector in accordance with the controls exerted by the pilot to simulate changes in pitch of the airplane.

6. In combination for simulating the flights of an airplane over terrain as represented by a model of the terrain and for simulating such flights in accordance with the controls exerted by an operator such as a pilot, including, a dolly movable along the model in a direction corresponding to the longitudinal movements of the airplane, a drift saddle movable along the model on the dolly in a direction for simulating lateral drift of the airplane, a carriage movable on the drift saddle in a direction toward or away from the model to simulate altitudinal movements of the airplane, a television camera supported on the carriage for receiving visual images representing a portion of the model dependent upon the positioning of the dolly, the drift saddle and the carriage, a reflector disposed between the camera and the model to direct the visual images from the model toward the television camera, means including a television transmitter for converting the visual image seen by the camera into corresponding electrical signals, means including a television receiver for converting the transmitted signals into a corresponding visual image and for projecting the visual images seen by the camera into the field of view of the pilot for the exertion of controls by the pilot in accordance with the visual images seen by the pilot, means including computer and servomechanism means actuated in accordance with controls exerted by the pilot for respectively moving the dolly in to simulate forward movement of the airplane, moving the drift saddle to simulate lateral movements of the airplane, moving the carriage to simulate altitudinal movements of the airplane, rotating the camera to simulate changes in roll of the airplane, rotating the camera and the reflector to simulate changes in yaw of the airplane, and pivoting the reflector to simulate changes in pitch of the airplane.

7. For use in apparatus simulating flights over terrain as represented by a model of the terrain in accordance with the manipulation of aircraft flight controls by an operator such as a student pilot, the combination comprising: a television camera having an optical axis fixed substantially normal to the plane in which the model of the terrain is positioned; a pivoted mirror intersecting the optical axis of the camera to effectively change the optical axis in accordance with the position of the mirror, said mirror transmitting to the camera a reflected image of the model of the terrain; camera motor means rotating only said camera about its optical axis; mirror motor means rotating only said mirror about its pivot axis; further motor means rotating both the camera and the mirror about the optical axis of the camera; computer means for operating each of said motor means in accordance with pilot manipulation of the aircraft flight controls, said computer means respectively operating the camera motor means to correspond to the changes in roll of the aircraft, operating the mirror motor means to correspond to changes in pitch of the aircraft, and operating said further motor means to correspond to changes in the yaw of the aircraft.

References Cited in the file of this patent

UNITED STATES PATENTS

| | | |
|---|---|---|
| 2,350,351 | Grunberg | June 6, 1944 |
| 2,396,660 | Kanter | Mar. 19, 1946 |
| 2,485,266 | Edinburg | Oct. 18, 1949 |
| 2,591,752 | Wicklund | Apr. 8, 1952 |
| 2,657,476 | Holcombe | Nov. 3, 1953 |
| 2,711,594 | Hickey | June 28, 1955 |

FOREIGN PATENTS

| | | |
|---|---|---|
| 739,593 | Great Britain | Nov. 2, 1955 |
| 751,628 | Great Britain | July 4, 1956 |
| 753,365 | Great Britain | July 25, 1956 |